US010200689B2

(12) United States Patent
Sole Rojals et al.

(10) Patent No.: US 10,200,689 B2
(45) Date of Patent: Feb. 5, 2019

(54) QUANTIZED PULSE CODE MODULATION IN VIDEO CODING

(75) Inventors: Joel Sole Rojals, La Jolla, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 999 days.

(21) Appl. No.: 13/362,928

(22) Filed: Jan. 31, 2012

(65) Prior Publication Data

US 2012/0224640 A1 Sep. 6, 2012

Related U.S. Application Data

(60) Provisional application No. 61/449,413, filed on Mar. 4, 2011.

(51) Int. Cl.
*H04N 7/30* (2006.01)
*H04N 19/124* (2014.01)
*H04N 19/176* (2014.01)

(52) U.S. Cl.
CPC ......... *H04N 19/124* (2014.11); *H04N 19/176* (2014.11)

(58) Field of Classification Search
CPC ......... H04N 19/0009; H04N 19/00278; H04N 7/26079; H04N 7/26244; H04N 19/00066;
(Continued)

(56) References Cited

U.S. PATENT DOCUMENTS 5,150,432 A 9/1992 Ueno et al.
5,260,782 A 11/1993 Hui
(Continued)

FOREIGN PATENT DOCUMENTS

CN 1246246 A 3/2000
CN 1937776 A 3/2007
(Continued)

OTHER PUBLICATIONS

Anonymous: "Algorithm for Adaptive Block Transform", Research Disclosure, Mason Publications, vol. 416, No. 44, Dec. 1, 1998, 2 pp.
Chono, K. et al., "Pulse code modulation mode for HEVC," Joint Collaborative Team on Video Coding, Document: JCTVC-D044, Jan. 20-28, 2011, 5 pp.
Chujoh, T. et al., "Internal bit depth increase for coding efficiency," International Telecommunication Union—Telecommunications Standardization Sector, Document: VCEG-AE13, Jan. 15-16, 2007, 6 pp.
(Continued)

*Primary Examiner* — Anand S Rao
*Assistant Examiner* — Samuel D Fereja
(74) *Attorney, Agent, or Firm* — Shumaker & Sieffert, P.A.

(57) ABSTRACT

A quantized PCM mode includes the step of quantizing samples so that distortion is added to coded video. In this way, video blocks coded with quantized PCM appear more uniformly with adjacent video blocks that have been coded with other lossy compression techniques, such as interprediction coding or intra-prediction coding. A video encoder may first quantize input video samples with a quantization step prior to PCM coding the quantized samples. This quantization step may be signaled to a decoder in the encoded video bitstream. A video decoder may receive the encoded video bitstream that includes quantized PCM coded video samples. These samples are first decoded using pulse code demodulation and then are inverse quantized with the same quantization step used to encode the video. The video decoder may extract this quantization step from the output bit-depth in the encoded video bitstream.

47 Claims, 8 Drawing Sheets

(58) Field of Classification Search
CPC ....... H04N 19/00078; H04N 19/00169; H04N 19/00309; H04N 19/00315; H04N 19/00321; H04N 19/00424; H04N 19/00448; H04N 19/00545; H04N 19/00781

See application file for complete search history.

(56) References Cited

U.S. PATENT DOCUMENTS

| | | | |
|---|---|---|---|
| 5,708,511 | A | 1/1998 | Gandhi et al. |
| 5,777,679 | A | 7/1998 | Cheney et al. |
| 6,031,575 | A | 2/2000 | Suzuki et al. |
| 6,256,347 | B1 | 7/2001 | Yu et al. |
| 6,459,812 | B2 | 10/2002 | Suzuki et al. |
| 7,143,432 | B1 | 11/2006 | Brooks et al. |
| 7,155,057 | B2 | 12/2006 | Kondo |
| 7,352,811 | B2 | 4/2008 | Stone et al. |
| 7,634,526 | B2 | 12/2009 | Laksono et al. |
| 7,634,727 | B2 | 12/2009 | Maciesowicz et al. |
| 7,715,638 | B2 | 5/2010 | Kalevo |
| 7,729,423 | B2 | 6/2010 | Kottke et al. |
| 8,208,545 | B2 | 6/2012 | Seo et al. |
| 2005/0276326 | A1 | 12/2005 | Drezner |
| 2006/0227871 | A1* | 10/2006 | Budagavi ................. 375/240.12 |
| 2006/0257034 | A1 | 11/2006 | Gish et al. |
| 2007/0036215 | A1 | 2/2007 | Pan et al. |
| 2007/0047646 | A1 | 3/2007 | Koh et al. |
| 2007/0086663 | A1 | 4/2007 | Lee et al. |
| 2007/0110151 | A1 | 5/2007 | Yu et al. |
| 2007/0211804 | A1* | 9/2007 | Haupt et al. ................. 375/242 |
| 2007/0280353 | A1 | 12/2007 | Arakawa et al. |
| 2008/0130746 | A1 | 6/2008 | Soroushian et al. |
| 2008/0226183 | A1 | 9/2008 | Lei et al. |
| 2009/0010557 | A1 | 1/2009 | Zheng et al. |
| 2009/0052536 | A1 | 2/2009 | Tajime |
| 2009/0067734 | A1 | 3/2009 | Kalevo |
| 2009/0074315 | A1 | 3/2009 | Niu |
| 2009/0135921 | A1 | 5/2009 | Lei et al. |
| 2010/0027616 | A1 | 2/2010 | Lu et al. |
| 2010/0111183 | A1 | 5/2010 | Jeon et al. |
| 2010/0166328 | A1* | 7/2010 | Kim .............................. 382/243 |
| 2010/0177820 | A1 | 7/2010 | Chono et al. |
| 2010/0208804 | A1 | 8/2010 | Yu et al. |
| 2010/0208805 | A1 | 8/2010 | Yu et al. |
| 2010/0220936 | A1 | 9/2010 | Yamaguchi et al. |
| 2010/0238998 | A1* | 9/2010 | Nanbu et al. ............ 375/240.03 |
| 2010/0290524 | A1* | 11/2010 | Lu et al. .................. 375/240.03 |
| 2010/0296577 | A1* | 11/2010 | Lien ......................... 375/240.03 |
| 2010/0316119 | A1 | 12/2010 | Mathew et al. |
| 2011/0013693 | A1 | 1/2011 | Shimizu et al. |
| 2011/0019931 | A1 | 1/2011 | Hamada et al. |
| 2011/0292247 | A1* | 12/2011 | Gharavi-Alkhansari et al. ........... 348/231.99 |
| 2012/0170652 | A1* | 7/2012 | Guo et al. ................ 375/240.12 |
| 2012/0224774 | A1 | 9/2012 | Lim et al. |
| 2013/0058411 | A1* | 3/2013 | Xu et al. .................. 375/240.12 |
| 2014/0233631 | A1* | 8/2014 | Narroschke et al. ..... 375/240.02 |

FOREIGN PATENT DOCUMENTS

| | | | |
|---|---|---|---|
| CN | 101087417 | A | 12/2007 |
| GB | 2463974 | A | 4/2010 |
| JP | 5341277 | B2 | 11/2013 |
| KR | 20100111841 | A | 10/2010 |
| RU | 2189120 | C2 | 9/2002 |
| RU | 2220511 | C2 | 12/2003 |
| WO | 9933266 | A2 | 7/1999 |
| WO | 2011149848 | A1 | 12/2011 |
| WO | 2012008130 | A1 | 1/2012 |
| WO | 2012114725 | A1 | 8/2012 |

OTHER PUBLICATIONS

International Search Report and Written Opinion of international application No. PCT/US2012/023497, dated Apr. 12, 2012, 14 pp.

Chono et al., Description of video coding technology proposal by NEC (JCTVC-A104), NEC Corporation Presented in the first meeting of the Joint Collaborative Team on Video Coding (JCT-VC) Dresden, Germany, Apr. 15-23, 2010, pp. 1-29.

International Telecommunication Union, "ITU-T H.264, Series H: Audiovisual and Multimedia Systems, Infrastructure of audiovisual services—Coding of moving video, Advanced video coding for generic audiovisual services," Mar. 2010, 669 pp.

Bross et al., "WD4: Working Draft 4 of High-Efficiency Video Coding," 6th Meeting: JCTVC-F803_d2, Torino, IT, Jul. 14-22, 2011, 226 pp.

Bross et al., "WD5: Working Draft 5 of High-Efficiency Video Coding," 7th Meeting: Geneva, Switzerland, Nov. 21-30, 2011, JCTVC-G1103_d2, 214 pp.

Bross et al., "High efficiency video coding (HEVC) text specification draft 6," 8th Meeting: San Jose, CA, USA, Feb. 1-10, 2012, JCTVC-H1003, 259 pp.

International Preliminary Report on Patentability—PCT/US2012/023497, The International Bureau of WIPO—Geneva, Switzerland, May 14, 2013, 20 pp.

ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.

Wiegand et al., "WD1: Working Draft 1 of High-Efficiency Video Coding", JCTVC-C403, 3rd Meeting: Guangzhou, CN, Oct. 7-15, 2010, 137 pp.

Wiegand et al., "WD2: Working Draft 2 of High-Efficiency Video Coding," JCTVC-D503, 4th Meeting: Daegu, KR, Jan. 20-28, 2011, 153 pp.

Wiegand et al., "WD3: Working Draft 3 of High-Efficiency Video Coding," Document JCTVC-E603, 5th Meeting: Geneva, CH, Mar. 16-23, 2011, 193 pp.

Second Written Opinion from application No. PCT/US2012/023497, dated Jan. 29, 2013, 7 pp.

Chono K. et al., "Rounding-error conscious memory compression method for IBDI," Joint Collaborative Team on Video Coding (JCT-VC) of ITU-T SG16 WP3 and ISO/IEV JTC1/SC29/WG11, 4th Meeting: Daegu, Korea, Jan. 20-28, 2011, Document: JCTVC-D045-rev1, WG11 No. m18792, 6 pages.

CHUJOH T., "Tool Experiment 2 on IBDI and Memory Compression," Joint Collaborative Team on Video Coding (JCT-VC) of ITU-T SG16 WP3 and ISO/IEC JTC1/SC29/WG111, 1st Meeting: Dresden, DE, Apr. 15-23, 2010, Document: JCTVC-A302, 5 pages.

Rapporteur: Toolbox for content coding, TD-81, Study Group 16, Seoul, Jan. 17-23, 2008, 65 pages.

Sullivan G J., et al., "The H.264/AVC Advanced Video Coding Standard: Overview and Introduction to the Fidelity Range Extensions," Proceedings of the SPIE, vol. 5558, 2004, pp. 454-474.

* cited by examiner

QUANTIZED PULSE CODE MODULATION IN VIDEO CODING

This application claims the benefit of U.S. Provisional Application No. 61/449,413, filed Mar. 4, 2011, which is hereby incorporated by reference in its entirety.

TECHNICAL FIELD

This disclosure relates to video coding and, more particularly to techniques for quantized pulse code modulation (PCM) of video data.

BACKGROUND

Digital video capabilities can be incorporated into a wide range of devices, including digital televisions, digital direct broadcast systems, wireless broadcast systems, personal digital assistants (PDAs), laptop or desktop computers, digital cameras, digital recording devices, digital media players, video gaming devices, video game consoles, cellular or satellite radio telephones, video teleconferencing devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards, to transmit, receive and store digital video information more efficiently.

Video compression techniques include spatial prediction and/or temporal prediction to reduce or remove redundancy inherent in video sequences. For block-based video coding, a video frame or slice may be partitioned into blocks. Each block can be further partitioned. Blocks in an intra-coded (I) frame or slice are encoded using spatial prediction with respect to reference samples in neighboring blocks in the same frame or slice. Blocks in an inter-coded (P or B) frame or slice may use spatial prediction with respect to reference samples in neighboring blocks in the same frame or slice or temporal prediction with respect to reference samples in other reference frames. Spatial or temporal prediction results in a predictive block for a block to be coded. Residual data represents pixel differences between the original block to be coded and the predictive block.

An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in a particular order to produce a one-dimensional vector of transform coefficients for entropy coding.

SUMMARY

In general, this disclosure describes devices and methods for video coding using quantized pulse code modulation (PCM). Quantized PCM includes the step of quantizing video samples so that distortion, in some circumstances, may be added to the coded video. In this way, video blocks coded with quantized PCM appear more uniformly with adjacent video blocks that have been coded with other lossy compression techniques, such as inter-prediction coding or intra-prediction coding.

A video encoder, for example, may first quantize input video samples with a quantization step prior to PCM coding the quantized samples. The quantization step generally adds distortion to the video and defines the output bit-depth of the quantized PCM coded samples. This quantization step and/or output bit-depth may be signaled to a decoder in the encoded video bitstream. As one example, an indication of the output bit-depth may be included as a 4-bit syntax element in the sequence header of an encoded bitstream.

A video decoder, as another example, may receive the encoded video bitstream that includes quantized PCM coded video samples. These samples are first decoded using pulse code demodulation and then are inverse quantized with the same quantization step used to encode the video. As one example, the video decoder may extract this quantization step from the encoded video bitstream.

In one example, the disclosure describes a method for coding video data comprising coding samples of a block of video data using quantized pulse code modulation according to an output bit-depth. The quantized pulse code modulation a includes quantizing the samples of the block of video data according to a quantization step defining an amount of quantization to produce the output bit-depth, and pulse code modulating the quantized samples. The disclosure also describes a method for decoding video data comprising decoding the samples of the coded block of video data using pulse code demodulation and inverse quantizing the decoded samples according to a quantization step.

In another example, the disclosure describes an apparatus configured to code video data. The apparatus includes a video encoding unit configured to code samples of a block of video data using quantized pulse code modulation according to an output bit-depth. The video coding unit includes a quantization unit configured to quantize the samples of the block of video data according to a quantization step defining an amount of quantization to produce the output bit-depth, and a modulation unit configured to code the quantized samples using pulse code modulation. The disclosure also describes an apparatus configured to decode video data. The apparatus includes a video decoding unit configured to decode samples of the coded block of video data that have been encoded with quantized pulse code modulation according to an output bit-depth. The video decoding unit includes a demodulation unit configured to decode the samples of the coded block of video data using pulse code demodulation and an inverse quantization unit configured to inverse quantize the decoded samples according to a quantization step.

In another example, the disclosure describes a computer program product comprising a computer-readable storage medium having stored thereon instructions that, when executed, cause a processor of a device for coding video to code samples of a block of video data using quantized pulse code modulation according to an output bit-depth. The instructions to code samples of a block of video data using quantized pulse code modulation include instructions to quantize the samples of the block of video data according to a quantization step defining an amount of quantization to produce the output bit-depth, and to pulse code modulate the quantized samples. The disclosure also describes a computer program product to decode video data including instructions to decode samples of the coded block of video data that have been encoded with quantized pulse code modulation according to an output bit-depth. The instructions to decode samples of a block of video data include instructions to decode the samples of the coded block of video data using pulse code demodulation and to inverse quantize the decoded samples according to a quantization step.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
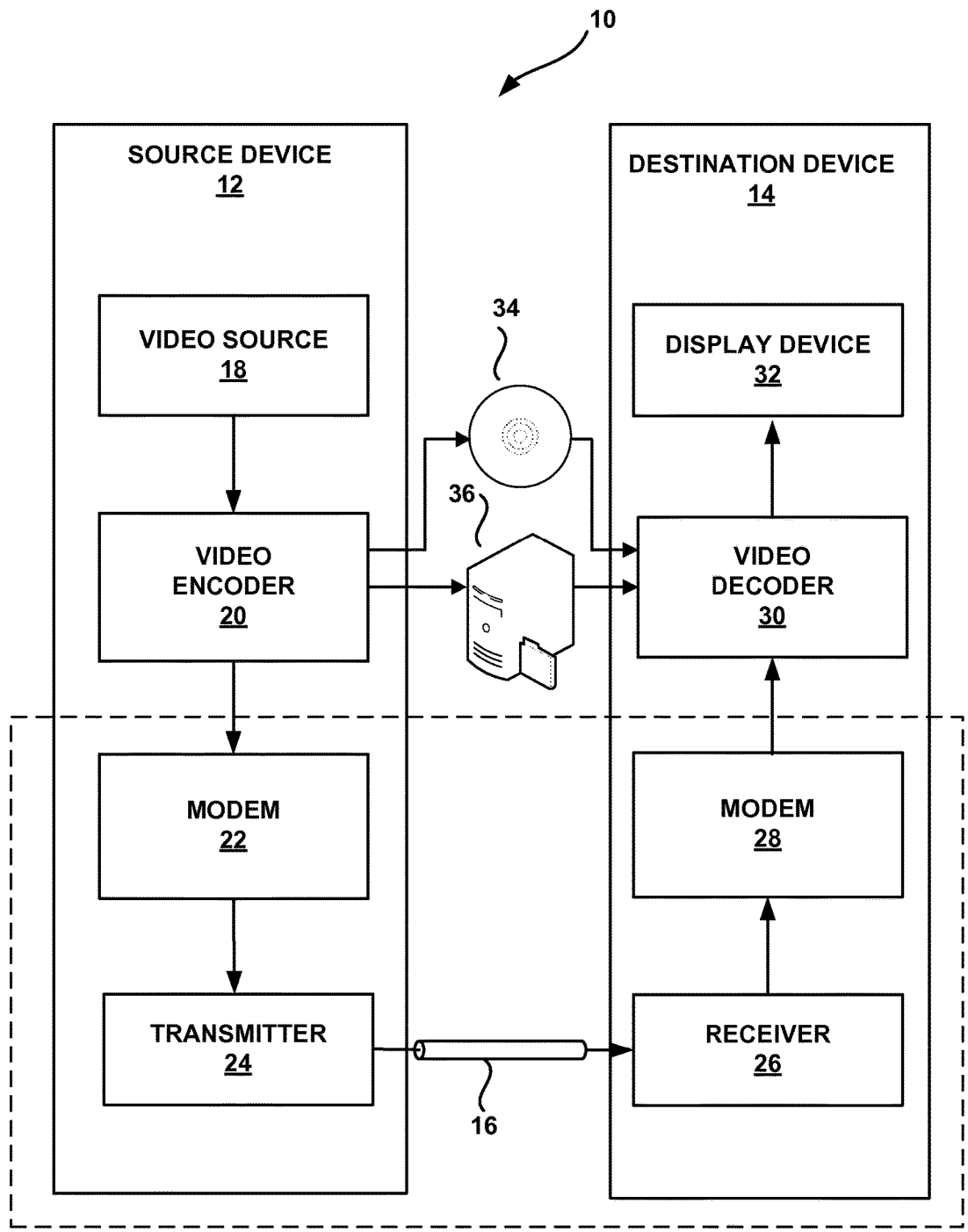
FIG. 1 is a block diagram illustrating an example video encoding and decoding system.

Digital video devices implement video compression techniques to transmit and receive digital video information more efficiently. Video compression may apply spatial (i.e., intra-frame) prediction and/or temporal (i.e., inter-frame) prediction techniques to reduce or remove redundancy inherent in video sequences.

For video coding according to the high efficiency video coding (HEVC) standard, a video frame may be partitioned into coding units, prediction units and transform units. A coding unit generally refers to an image region that serves as a basic unit to which various coding tools are applied for video compression. A coding unit is typically square-shaped, and may be considered to be similar to a so-called macroblock, e.g., under other video coding standards such as ITU-T H.264. A coding unit may be partitioned into smaller and smaller coding units according to a quadtree partitioning scheme.

To achieve better coding efficiency, a coding unit may have variable sizes depending on video content. In addition, a coding unit may be split into smaller blocks for prediction or transform. In particular, each coding unit may be further partitioned into prediction units and transform units. Prediction units may be considered to be similar to so-called macroblock partitions under other video coding standards. Transform units refer to blocks of residual data to which a transform is applied to produce transform coefficients.

A coding unit usually has one luminance component, denoted as Y, and two chroma components, denoted as U and V. Depending on the video sampling format, the size of the U and V components, in terms of number of samples, may be the same as or different from the size of the Y component.

To code a block (e.g., a prediction unit of video data), a predictor for the block is first derived. The predictor can be derived either through intra (I) prediction (i.e., spatial prediction) or inter (P or B) prediction (i.e., temporal prediction). Hence, some prediction units may be intra-coded (I) using spatial prediction with respect to neighboring reference blocks in the same frame, and other prediction units may be inter-coded (P or B) with respect to reference blocks in other frames.

Upon identification of a predictor, the difference between the original video data block and its predictor is calculated. This difference is also called the prediction residual, and refers to the pixel differences between the pixels in the block to be coded and the reference block, i.e., predictor. To achieve better compression, the prediction residual is generally transformed, e.g., using a discrete cosine transform (DCT), integer transform, Karhunen-Loeve (K-L) transform, or other transform.

The transform converts pixel difference values in the spatial domain to transform coefficients in the transform domain, e.g., a frequency domain. The transform coefficients are normally arranged in a two-dimensional (2-D) array for each transform unit. For further compression, the transform coefficients may be quantized. An entropy coder then applies entropy coding, each Context Adaptive Variable Length Coding (CAVLC), Context Adaptive Binary Arithmetic Coding (CABAC), or the like, to the quantized transform coefficients.

In some cases when using the above-described techniques, it is possible for the video encoder to act as a data expander rather than a data compressor. Although an encoder generally achieves very good compression for most video content, isolated parts of a video frame containing atypical content in the transform domain may produce large amounts of encoded data. Consequently, for some video content, the encoder may not fulfill the objective of compressing video data, and instead may produce excessive data. For these cases, a video encoder may improve overall video compression by applying pulse code modulation (PCM) coding instead of predictive coding. PCM coding is usually a lossless coding process that encodes the individual samples of video data without prediction-based compression.

The MPEG-2 video coding standard, as an example, specifies an upper limit on the number of coded bits that can be generated for an encoded macroblock of video data. An upper limit aids in decoder design by specifying a particular amount of data that is obtained and then processed for macroblock decoding. Generation of coding bits in excess of this upper limit would be inconsistent with MPEG-2 decoder design.

In the Intra PCM mode specified by the ITU-T H.264/MPEG-4 AVC standard (hereinafter H.264), the encoder transmits sample values of a macroblock without prediction, transform coding, and entropy coding. That is, in the Intra PCM mode for macroblocks, the encoder simply encodes the pixel values in the region of the macroblock using, e.g., 8 bits per sample. The encoder generates the PCM-encoded pixel values as raw byte values. The Intra PCM mode allows encoders to adjust the number of bits of each macroblock to a predetermined value or less without complicated computation.

The use of Intra PCM mode coding in H.264 is indicated by a macroblock mode syntax element. When Intra PCM mode coding is used, the sample values of each associated macroblock are transmitted without prediction, transform coding, and entropy coding. Note that, when the entropy coding is context-adaptive binary arithmetic coding (CABAC), binary arithmetic coding (BAC) is terminated and initialized prior to transmitting sample values.

The current model of HEVC has no tool comparable to Intra PCM in H.264. One issue is that the characteristics of HEVC are different than those of H.264. In H.264, the amount of data is limited at a macroblock level, which has a size of 16×16 pixels. In contrast, HEVC has coding units and prediction units up to 64×64 pixels, or possibly larger. As a result, the constraint to limit the amount of data per unit is higher, in order to meet some network requirements found in practice, in HEVC than it is for H.264.

Another issue of the Intra PCM mode in H.264 is that it is lossless. With lossless coding, the encoded data has perfect reconstruction at the decoder side. Therefore, a completely undistorted macroblock can appear in an otherwise lossy encoded frame. This can be visually shocking, or at least visually noticeable, due to the visual differences between lossless data and adjacent lossy data.

Yet another issue of HEVC is that it may support content of 8 bits, 10 bits, 12 bits or even larger bit-depths. So, the signaling of a 64×64 coding unit (or larger) with 12 bits per sample may result in an undesirable amount of data for PCM mode.

This disclosure introduces the concept of a quantized PCM mode for use in video coding processes, such as those defined according to the H.264 and HEVC standards. In the quantized PCM mode, the video encoder quantizes blocks of input pixels prior to application of PCM coding. Similarly, when video data has been coded using the quantized PCM mode, a video decoder would first pulse demodulate the coded video data and then apply inverse quantization. Coding units (HEVC), prediction units (HEVC), transform units (HEVC), macroblocks (H.264), and partitions (H.264) will be generally referred to in this disclosure as blocks.

The quantized PCM mode may support two goals. First, quantized PCM coding may permit an encoder to specify a flexible limitation on the maximum amount of data for a coding unit in different situations, such as different levels, profiles, frame rates, quantization parameters (QPs), resolutions, or the like. Without such a limitation, PCM coding could overwhelm the level of available coding bits for a block. This flexibility may be achieved by applying context-specific quantization steps so as to control the output bit-depth, and thus the maximum amount of data produced for the PCM coded video data. Second, by introducing loss in to the PCM process, the quantized PCM coding may reduce or eliminate the undesirable visual appearance of a video frame that includes both lossy and lossless parts in a straightforward way.

FIG. 1 is a block diagram illustrating an example video encoding and decoding system 10 that may be configured to utilize techniques for quantized pulse code modulation/demodulation in accordance with examples of this disclosure. As shown in FIG. 1, the system 10 includes a source device 12 that transmits encoded video to a destination device 14 via a communication channel 16. Encoded video may also be stored on a storage medium 34 or a file server 36 and may be accessed by the destination device 14 as desired. The source device 12 and the destination device 14 may comprise any of a wide variety of devices, including desktop computers, notebook (i.e., laptop) computers, tablet computers, set-top boxes, telephone handsets such as so-called smartphones, televisions, cameras, display devices, digital media players, video gaming consoles, or the like. In many cases, such devices may be equipped for wireless communication. Hence, the communication channel 16 may comprise a wireless channel, a wired channel, or a combination of wireless and wired channels suitable for transmission of encoded video data. Similarly, the file server 36 may be accessed by the destination device 14 through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server.

Techniques for quantized pulse code modulation/demodulation, in accordance with examples of this disclosure, may be applied to video coding in support of any of a variety of multimedia applications, such as over-the-air television broadcasts, cable television transmissions, satellite television transmissions, streaming video transmissions, e.g., via the Internet, encoding of digital video for storage on a data storage medium, decoding of digital video stored on a data storage medium, or other applications. In some examples, the system 10 may be configured to support one-way or two-way video transmission to support applications such as video streaming, video playback, video broadcasting, and/or video telephony.

In the example of FIG. 1, the source device 12 includes a video source 18, a video encoder 20, a modulator/demodulator 22 and a transmitter 24. In the source device 12, the video source 18 may include a source such as a video capture device, such as a video camera, a video archive containing previously captured video, a video feed interface to receive video from a video content provider, and/or a computer graphics system for generating computer graphics data as the source video, or a combination of such sources. As one example, if the video source 18 is a video camera, the source device 12 and the destination device 14 may form so-called camera phones or video phones. However, the techniques described in this disclosure may be applicable to video coding in general, and may be applied to wireless and/or wired applications.

The captured, pre-captured, or computer-generated video may be encoded by the video encoder 20. The encoded video information may be modulated by the modem 22 according to a communication standard, such as a wireless communication protocol, and transmitted to the destination device 14 via the transmitter 24. The modem 22 may include various mixers, filters, amplifiers or other components designed for signal modulation. The transmitter 24 may include circuits designed for transmitting data, including amplifiers, filters, and one or more antennas.

The captured, pre-captured, or computer-generated video that is encoded by the video encoder 20 may also be stored onto a storage medium 34 or a file server 36 for later consumption. The storage medium 34 may include Blu-ray discs, DVDs, CD-ROMs, flash memory, or any other suitable digital storage media for storing encoded video. The encoded video stored on the storage medium 34 may then be accessed by the destination device 14 for decoding and playback.

The file server 36 may be any type of server capable of storing encoded video and transmitting that encoded video to the destination device 14. Example file servers include a web server (e.g., for a website), an FTP server, network attached storage (NAS) devices, a local disk drive, or any other type of device capable of storing encoded video data and transmitting it to a destination device. The transmission of encoded video data from the file server 36 may be a streaming transmission, a download transmission, or a combination of both. The file server 36 may be accessed by the destination device 14 through any standard data connection, including an Internet connection. This may include a wireless channel (e.g., a Wi-Fi connection), a wired connection (e.g., DSL, cable modem, Ethernet, USB, etc.), or a combination of both that is suitable for accessing encoded video data stored on a file server.

The destination device 14, in the example of FIG. 1, includes a receiver 26, a modem 28, a video decoder 30, and a display device 32. The receiver 26 of the destination device 14 receives information over the channel 16, and the modem 28 demodulates the information to produce a demodulated bitstream for the video decoder 30. The information communicated over the channel 16 may include a variety of syntax information generated by the video encoder 20 for use by the video decoder 30 in decoding video data. Such syntax may also be included with the encoded video data stored on a storage medium 34 or a file server 36. Each of the video encoder 20 and the video decoder 30 may form part of a respective encoder-decoder (CODEC) that is capable of encoding or decoding video data.

The display device 32 may be integrated with, or external to, the destination device 14. In some examples, the destination device 14 may include an integrated display device and also be configured to interface with an external display device. In other examples, the destination device 14 may be a display device. In general, the display device 32 displays the decoded video data to a user, and may comprise any of a variety of display devices such as a liquid crystal display (LCD), a plasma display, an organic light emitting diode (OLED) display, or another type of display device.

In the example of FIG. 1, the communication channel 16 may comprise any wireless or wired communication medium, such as a radio frequency (RF) spectrum or one or more physical transmission lines, or any combination of wireless and wired media. The communication channel 16 may form part of a packet-based network, such as a local area network, a wide-area network, or a global network such as the Internet. The communication channel 16 generally represents any suitable communication medium, or collection of different communication media, for transmitting video data from the source device 12 to the destination device 14, including any suitable combination of wired or wireless media. The communication channel 16 may include routers, switches, base stations, or any other equipment that may be useful to facilitate communication from the source device 12 to the destination device 14.

The video encoder 20 and the video decoder 30 may operate according to a video compression standard, such as the High Efficiency Video Coding (HEVC) standard presently under development, and may conform to the HEVC Test Model (HM). Alternatively, the video encoder 20 and the video decoder 30 may operate according to other proprietary or industry standards, such as the ITU-T H.264 standard, alternatively referred to as MPEG-4, Part 10, Advanced Video Coding (AVC), or extensions of such standards. The techniques of this disclosure, however, are not limited to any particular coding standard. Other examples include MPEG-2 and ITU-T H.263.

Although not shown in FIG. 1, in some aspects, the video encoder 20 and the video decoder 30 may each be integrated with an audio encoder and decoder, and may include appropriate MUX-DEMUX units, or other hardware and software, to handle encoding of both audio and video in a common data stream or separate data streams. If applicable, in some examples, MUX-DEMUX units may conform to the ITU H.223 multiplexer protocol, or other protocols such as the user datagram protocol (UDP).

The video encoder 20 and the video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of the video encoder 20 and the video decoder 30 may be included in one or more encoders or decoders, either of which may be integrated as part of a combined encoder/decoder (CODEC) in a respective device.

The video encoder 20 may implement any or all of the techniques of this disclosure to use a quantized PCM mode in a video encoding process. Likewise, the video decoder 30 may implement any or all of these techniques to use a quantized PCM mode in a video decoding process. A video coder, as described in this disclosure, may refer to a video encoder or a video decoder. Similarly, a video encoder and a video decoder may be referred to as video encoding units and video decoding units, respectively. Likewise, video coding may refer to video encoding or video decoding.

Figure 2:
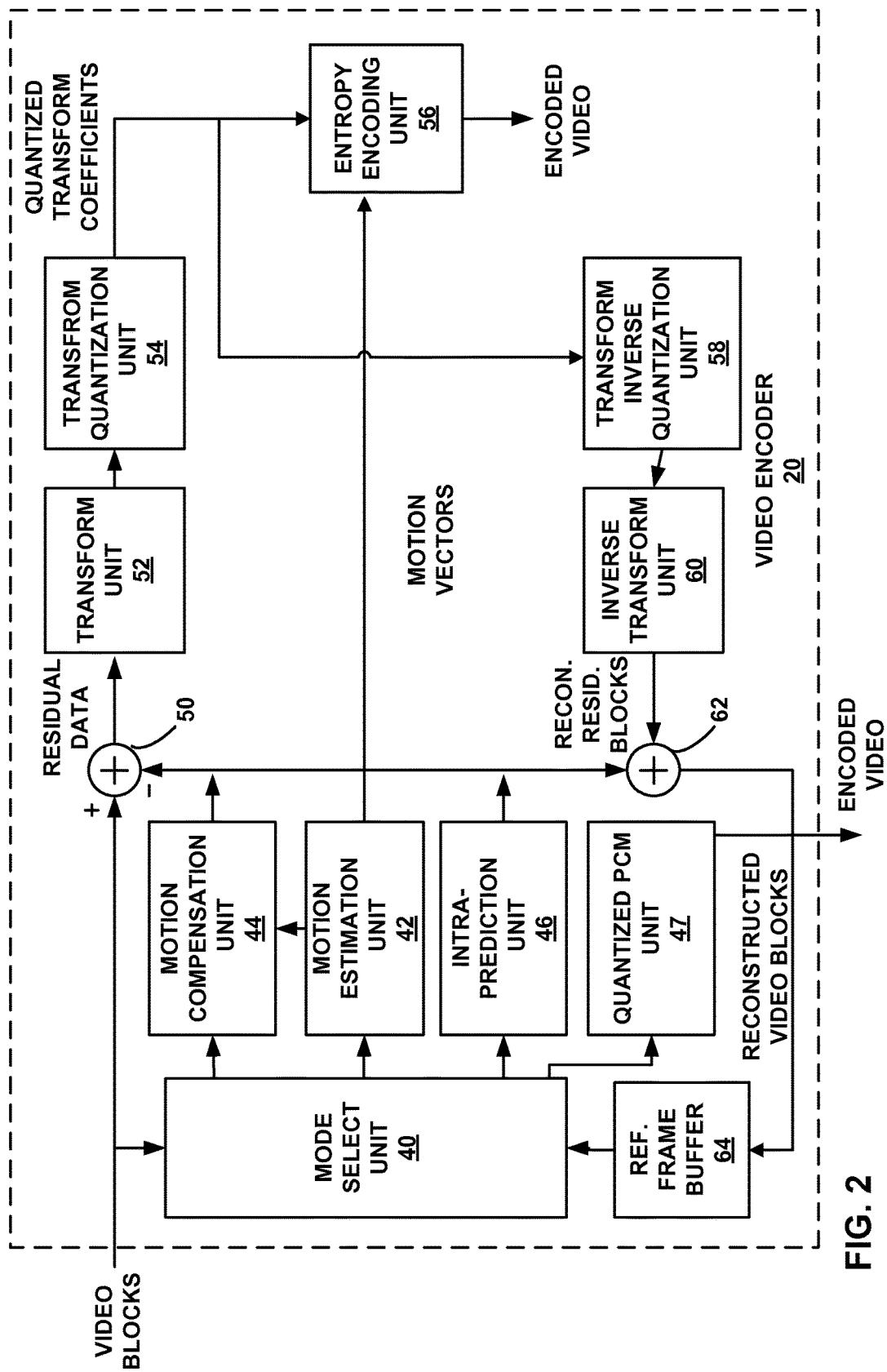
FIG. 2 is a block diagram illustrating an example video encoder.

FIG. 2 is a block diagram illustrating an example of a video encoder 20 that may use techniques for a quantized PCM mode in a video coding process as described in this disclosure. The video encoder 20 will be described in the context of HEVC coding for purposes of illustration, but without limitation of this disclosure as to other coding standards or methods that may benefit from a quantized PCM mode. In addition to quantized PCM video coding, the video encoder 20 may perform intra- and inter-coding of coding units within video frames.

Intra-coding relies on spatial prediction to reduce or remove spatial redundancy in video within a given video frame. Inter-coding relies on temporal prediction to reduce or remove temporal redundancy between a current frame and previously coded frames of a video sequence. Intra-mode (I-mode) may refer to any of several spatial-based video compression modes. Inter-modes such as uni-directional prediction (P-mode) or bi-directional prediction (B-mode) may refer to any of several temporal-based video compression modes.

As shown in FIG. 2, the video encoder 20 receives a current video block within a video frame to be encoded. In the example of FIG. 2, the video encoder 20 includes a motion compensation unit 44, a motion estimation unit 42, an intra-prediction unit 46, a quantized PCM unit 47, a reference frame buffer 64, a summer 50, a transform unit 52, a transform quantization unit 54, and an entropy coding unit 56. The transform unit 52 illustrated in FIG. 2 is the unit that applies the actual transform to a block of residual data, and is not to be confused with a block of transform coefficients, which also may be referred to as a transform unit (TU) of a CU. For video block reconstruction, the video encoder 20 also includes a transform inverse quantization unit 58, an inverse transform unit 60, and a summer 62. A deblocking filter (not shown in FIG. 2) may also be included to filter block boundaries to remove blockiness artifacts from reconstructed video. If desired, the deblocking filter would typically filter the output of the summer 62.

During the encoding process, the video encoder 20 receives a video frame or slice to be coded. The frame or slice may be divided into multiple video blocks, e.g., largest coding units (LCUs). The motion estimation unit 42 and the motion compensation unit 44 perform inter-predictive coding of the received video block relative to one or more blocks in one or more reference frames to provide temporal compression. The intra-prediction unit 46 may perform intra-predictive coding of the received video block relative to one or more neighboring blocks in the same frame or slice as the block to be coded to provide spatial compression. The quantized PCM unit 47 performs quantized PCM coding on the input video blocks in accordance with the techniques of this disclosure.

The mode select unit 40 may select one of the coding modes, intra, inter or quantized PCM, e.g., based on error (i.e., distortion) and/or compression results for each mode. If the inter or intra modes are selected, the mode select unit 40 provides the resulting intra- or inter-coded block to the summer 50 to generate residual block data and to the summer 62 to reconstruct the encoded block for use in a reference frame. Some video frames may be designated as I-frames, where all blocks in an I-frame are encoded in an intra-prediction mode. In some cases, the intra-prediction unit 46 may perform intra-prediction encoding of a block in a P- or B-frame, e.g., when motion search performed by the motion estimation unit 42 does not result in a sufficient prediction of the block.

The motion estimation unit 42 and the motion compensation unit 44 may be highly integrated, but are illustrated separately for conceptual purposes. Motion estimation is the process of generating motion vectors, which estimate motion for video blocks. A motion vector, for example, may indicate the displacement of a prediction unit in a current frame relative to a reference sample of a reference frame. A reference sample may be a block that is found to closely match the portion of the CU including the PU being coded in terms of pixel difference, which may be determined by sum of absolute difference (SAD), sum of square difference (SSD), or other difference metrics. Motion compensation, performed by the motion compensation unit 44, may involve fetching or generating values for the prediction unit based on the motion vector determined by motion estimation.

The motion estimation unit 42 calculates a motion vector for a prediction unit of an inter-coded frame by comparing the prediction unit to reference samples of a reference frame stored in the reference frame buffer 64. In some examples, the video encoder 20 may calculate values for sub-integer pixel positions of reference frames stored in the reference frame buffer 64. For example, the video encoder 20 may calculate values of one-quarter pixel positions, one-eighth pixel positions, or other fractional pixel positions of the reference frame. Therefore, the motion estimation unit 42 may perform a motion search relative to the full pixel positions and fractional pixel positions and output a motion vector with fractional pixel precision. The motion estimation unit 42 sends the calculated motion vector to the entropy coding unit 56 and the motion compensation unit 44. The portion of the reference frame identified by a motion vector may be referred to as a reference sample. The motion compensation unit 44 may calculate a prediction value for a prediction unit of a current CU, e.g., by retrieving the reference sample identified by a motion vector for the PU.

The intra-prediction unit 46 may perform intra-prediction encoding on the received block, as an alternative to the inter-prediction coding performed by the motion estimation unit 42 and the motion compensation unit 44. The intra-prediction unit 46 may encode the received block relative to neighboring, previously coded blocks, e.g., blocks above, above and to the right, above and to the left, or to the left of the current block, assuming a left-to-right, top-to-bottom encoding order for blocks. The intra-prediction unit 46 may be configured with a variety of different intra-prediction modes. For example, the intra-prediction unit 46 may be configured with a certain number of directional prediction modes, e.g., 33 directional prediction modes, based on the size of the CU being encoded.

The intra-prediction unit 46 may select an intra-prediction mode by, for example, calculating error values for various intra-prediction modes and selecting a mode that yields the lowest error value. Directional prediction modes may include functions for combining values of spatially neighboring pixels and applying the combined values to form one or more pixels of a predictive block for a PU. Once values for all pixel positions in the PU have been calculated, the intra-prediction unit 46 may calculate an error value for the prediction mode based on pixel differences between the PU and the predictive block. The intra-prediction unit 46 may continue testing intra-prediction modes until an intra-prediction mode that yields an acceptable error value is discovered. The intra-prediction unit 46 may then send the PU to the summer 50.

The video encoder 20 forms a residual block by subtracting the prediction data calculated by the motion compensation unit 44 or the intra-prediction unit 46 from the original video block being coded. The summer 50 represents the component or components that perform this subtraction operation. The residual block may correspond to a two-dimensional matrix of pixel difference values, where the number of values in the residual block is the same as the number of pixels in the PU corresponding to the residual block. The values in the residual block may correspond to the differences, i.e., error, between values of co-located pixels in the PU and in the original block to be coded. The differences may be chroma or luma differences depending on the type of block that is coded.

The transform unit 52 may form one or more transform units (TUs) from the residual block. The transform unit 52 applies a transform, such as a discrete cosine transform (DCT), a directional transform, or a conceptually similar transform, to the TU, producing a video block comprising transform coefficients. The transform unit 52 may send the resulting transform coefficients to the transform quantization unit 54. The transform quantization unit 54 may then quantize the transform coefficients. The entropy encoding unit 56 may then perform a scan of the quantized transform coefficients in the matrix according to a specified scan order to produce a one-dimensional array. This disclosure describes the entropy coding unit 56 as performing the scan. However, it should be understood that, in other examples, other processing units, such as the transform quantization unit 54, could perform the scan. The entropy encoding unit 56 then entropy encodes the 1D array of transform coefficients to produce an entropy coded bitstream.

The entropy encoding unit 56 may apply entropy coding such as CAVLC or CABAC to the scanned coefficients. In addition, the entropy coding unit 56 may encode motion vector (MV) information and any of a variety of syntax elements useful in decoding the video data at the video decoder 30. The video decoder 30 may use these syntax elements to reconstruct the encoded video data. Following the entropy coding by entropy coding unit 56, the resulting encoded video may be transmitted to another device, such as the video decoder 30, or archived for later transmission or retrieval.

The transform inverse quantization unit 58 and the inverse transform unit 60 apply inverse quantization and inverse transformation, respectively, to reconstruct the residual block in the pixel domain, e.g., for later use as a reference block. The motion compensation unit 44 may calculate a reference block by adding the residual block to a predictive block of one of the frames of the reference frame buffer 64. The motion compensation unit 44 may also apply one or more interpolation filters to the reconstructed residual block to calculate sub-integer pixel values for use in motion estimation. The summer 62 adds the reconstructed residual block to the motion compensated prediction block produced by the motion compensation unit 44 to produce a reconstructed video block for storage in the reference frame buffer 64. The reconstructed video block may be used by the motion estimation unit 42 and the motion compensation unit 44 as a reference block to inter-code a block in a subsequent video frame.

The quantized PCM unit 47 receives video blocks (e.g., coding units) from the mode select unit 40 when the quantized PCM mode is selected. As described above, the quantized PCM mode may be selected when it is determined that other coding modes (e.g., intra-prediction coding or inter-prediction coding) would act as a data expander rather than a data compressor for one or more coding units of a video frame. For example, the mode selection unit 40 may test the various coding modes on the block and determine whether or not the modes satisfy a desired rate-distortion metric. If the test indicates that a certain coding mode results in an excessive amount of coding bits to be allocated to achieve a desired maximum amount of distortion, the mode selection unit 40 may select the quantized PCM mode. As such, rather than performing a prediction technique on video blocks, as described above, the encoder would use the quantized PCM unit 47 to perform a quantized PCM coding process on each sample (i.e., pixel) of the block and would transmit those quantized PCM coded blocks in the encoded bitstream of video data.

The use of PCM coding may be signaled to a video decoder in an encoded video bitstream. A PCM flag (pcm_flag) may be signaled at the prediction unit level to indicate that PCM coding was used. If the prediction mode is intra, the partition size is 2N×2N, and the block size is larger than or equal to the minimum PCM block size, the pcm_flag is signaled. Note that if pcm_flag equals one, then several 0 bits may be signaled in the bitstream for padding until the beginning of the next byte (e.g., in order to have byte alignment). Additional syntax elements concerning PCM coding may be signaled in the sequence parameter set (SPS). For example, syntax elements indicating the PCM bit depth (or quantization step) for both luma and chroma components of the pixels (e.g., pcm_bit_depth_luma_minus1 and pcm_bit_depth_chroma_minus1).

Figure 3:
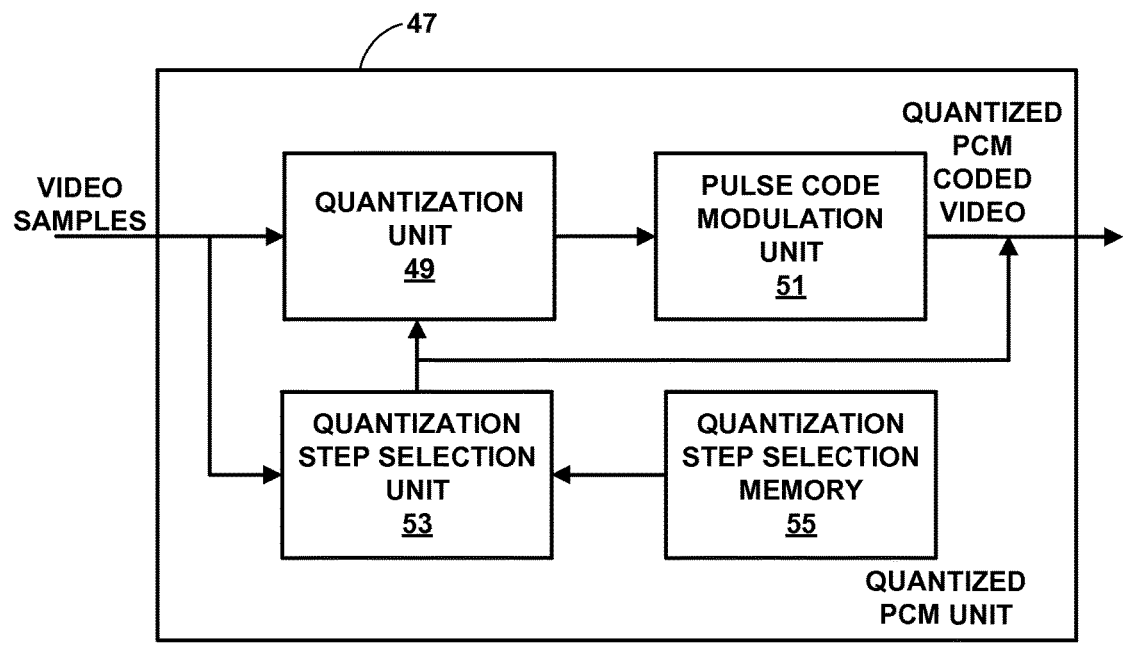
FIG. 3 is a block diagram illustrating an example quantized PCM unit of a video encoder.

FIG. 3 shows a block diagram of the quantized PCM unit 47 according to one aspect of the disclosure. As mentioned above, this disclosure presents techniques for applying quantized PCM coding to video samples (i.e., pixels) in a block of video data. Quantized PCM coding can be achieved by introducing a quantization step before PCM coding. In this context, quantization is a compression process whereby input values at a certain bit-depth m (e.g., pixel data represented by 10 bits) are mapped to an output value with a smaller bit-depth n (e.g., 6 bits). Hence, the input bit depth m is greater than the output bit depth n. This process will inherently involve rounding some of the input values, and as such, introduces loss into the compression.

As shown in FIG. 3, video samples are received by the quantized PCM unit 47 and are first quantized by a quantization unit 49. In this case, the quantization of video samples defines the eventual output bit-depth of the quantized PCM coded video. It should be understood that such "pixel domain" quantization (i.e., to define the bit-depth) may be used to quantize the input values of pixels, and is different from the "transform domain" quantization parameter (QP) that is typically used to quantize residual transform coefficients, such as by the transform quantization unit 54 shown in FIG. 2. The input samples may be quantized by the quantization unit 49 using this pixel domain quantization step to define the output bit-depth. As will be discussed in more detail with reference to FIGS. 5-6, a decoder may inverse quantize the coded samples using the quantization step and a rounding offset. The rounding offset can be specified by the encoder in the bitstream or imposed to be just half the quantization step (or some other specified fraction of the quantization step).

A quantization step selection unit 53 may be configured to select the quantization step. Alternatively, the quantization step unit 49 may be configured to use a predetermined quantization step. A predetermined quantization step may be stored in the quantization step selection memory 55. The quantization step selection unit 53 may selected the quantization step based on any of a variety of criteria, including characteristics of the block of video data to be coded by the quantized PCM process or characteristics of blocks of video data spatially near the block of video data to be coded y the quantized PCM process.

For example, the quantization step may be selected to produce encoded video data that satisfies a maximum amount of data permitted for a given block. A higher quantization step, and thus a smaller output bit-depth, will result in quantized PCM coded data of a lower data size. Conversely, a lower quantization step, and thus a larger output bit-depth, will results in quantized PCM coded data of a higher data size. As such, the quantization step may be a selectable parameter that defines the output bit-depth. The quantization step may be in the format of the output bit-depth itself, or may be indicated as a number of right shifts used to perform the quantization which then results in a quantized PCM coded video sample at a certain output bit-depth. As will be explained in more detail below, the output bit-depth and/or the quantization step may be indicated in the encoded bitstream so that a decoder may receive the quantization step and/or output bit depth and decode the PCM video data in the coded bitstream.

As another example, the quantization step may be selected to reduce the difference of appearance between the PCM-coded video data and the lossy data produced by predictive coding in spatially nearby blocks. In particular, the quantization step may be selected such that an amount of distortion presented by the PCM-coded video data is similar to the amount of distortion presented by the predictively coded video data. The amount of distortion may be determined by encoder 20 explicitly or estimated, for example, based on a quantization parameter (QP) used by the transform quantization unit 54 for predictively coded video data.

Other criteria that may be used by the quantization step selection unit 53 to select the quantization step include the frame spatial resolution, the quantization (QP) for the pertinent coding unit, the coding structure of a pertinent coding unit, frame rate, the frame type (e.g., intra (I) or inter (P or B) frame), the bit-depth of the input data, internal data or output data, the particular video application, or the level or the profile in which the pertinent video sequence is encoded.

The desired quality of the PCM block is related to the overall quality of a particular frame. The better the quality (e.g., frame type, bit-depth) of the frame, the more quality is desired for PCM mode. Also, if resolution is very large and the PCM block is small, there is much less visual impact than if it is the other way around. As one example, video for video conferencing applications is typically of lower quality PCM than video for DVDs. Also, there is a greater need in videoconferencing to reduce the bits spent in PCM. Considering combinations of these criteria may produce better results than considering a single criterion.

In each of these examples, the quantization steps may be selected based on an algorithm executed by the quantization step selection unit 53. As another example, multiple predetermined quantization steps that are appropriate for different contextual situations may be stored in a quantization step selection memory 55 that may be accessed by the quantization step selection unit 53.

In one example, the quantization unit 49 may perform quantization on the video samples by simply right shifting the input data. The right shifting quantization process, in effect, drops off the least significant bits of each of the input samples (i.e., pixels). In this example, the quantization step can be given to the quantization unit 49 by the quantization step selection unit 53 as an integer number that indicates the amount of right shifting. For instance, a right shift of the input data by 2 is the same as dividing by 4. With an 8-bit pixel input, a right shift of input data by 2 would imply a maximum amount of data that is 75% lower, i.e., from 8 bits per sample to 6 bits per sample. In another example, an offset is added to the pixel value before applying the right-shift. In another example, the quantization (or right shift) performed by the quantization unit 49 can be based on the bit-depth of the input video samples. The larger the bit-depth of the input video sample, the more it can be quantized without noticeable artifacts. Hence, the quantization step selection unit 53 may be configured to select a larger quantization step for 10-bit input data than it would for 8-bit input data.

After quantization, the pulse code modulation unit 51 pulse code modulates the quantized video samples. The conventional intra-PCM mode for H.264 simply passes the digital values of the pixels uncompressed into the encoded bitstream. As such, intra-PCM for H.264 is lossless. According to this disclosure, the pulse code modulation unit 51 modulates the digital values of the video samples after quantization (i.e., a form of lossy compression). As such, the quantization step selected by the quantization step selection unit 53 defines the output bit-depth of the video samples coded by the pulse code modulation unit. As stated above, in some circumstances the quantization step may be in the format of the output bit-depth itself, or may be indicated as a number of right shifts that defines the output bit-depth.

The output bit-depth, rounding offset, and/or quantization step may be signaled by the encoder as syntax elements in the encoded bitstream. In this context, signaling syntax elements in the encoded bitstream does not require real-time transmission of such elements from the encoder to a decoder, but rather means that such syntax elements are encoded into the bitstream and are made accessible to the decoder in any fashion. This may include real-time transmission (e.g., in video conferencing) as well as storing the encoded bitstream on a computer-readable medium for future use by a decoder (e.g., in streaming, downloading, disk access, card access, DVD, Blu-ray, etc.). As mentioned above, the quantization step may indicate the output bit-depth itself or may represent the number of right shifts that was performed to quantize the input video samples. Either the output bit-depth or quantization step may be signaled to the decoder in order for the decoder to apply the appropriate process to decode the encoded data.

In one example, the quantization step may be a predetermined value that is used for all situations by both the encoder and the decoder. In another example, as discussed above, the quantization step selection unit 53 may determine the quantization step based on characteristics of the input video blocks and/or surrounding video blocks. The decoder may infer a certain value of the quantization step of quantized PCM coded video data based on the same characteristics used by the encoder to select the quantization step.

As another example, the output bit-depth and/or the quantization step may be signaled to the decoder in the encoded bitstream. In addition, a rounding offset may be specified by the encoder in the bitstream or may be predetermined to be half the quantization step (or some other specified fraction of the quantization step). One way to signal the output bit-depth, rounding offset, and/or quantization step is by encoding a syntax element that indicates the bit-depth of the quantized PCM samples. FIG. 3 depicts the quantization step selection unit 53 as encoding the selected quantization step in the encoded bitstream. However, this process may be accomplished by the quantization unit 49, the pulse code modulation unit 51, or another unit of the quantized PCM unit 47 or the encoder 20.

Figure 4:
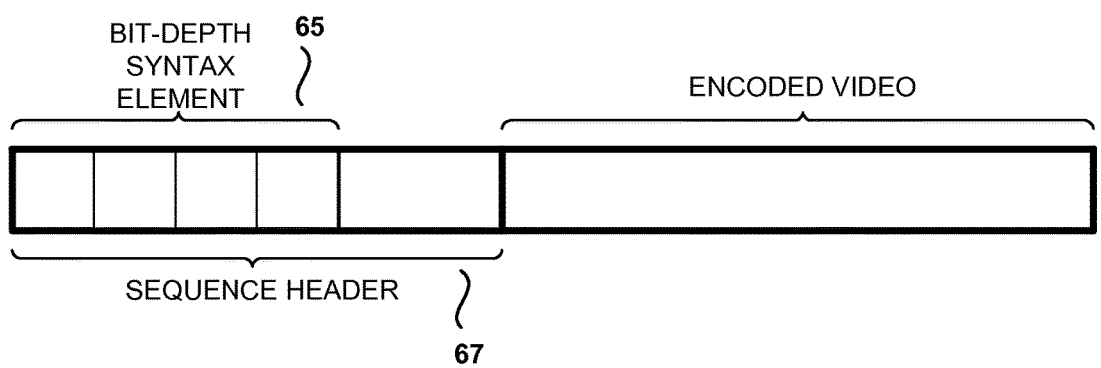
FIG. 4 depicts an example encoded video bitstream with a sequence header.

In another example, the syntax element can be sent at the sequence header, sequence parameter set level (e.g., the picture parameter set level), at a slice level or at other syntax levels in the encoded bitstream. FIG. 4 depicts an example encoded video bitstream with a sequence header. The sequence header 67 includes a bit-depth syntax element 65 that indicates the output bit-depth of the quantized PCM encoded video. As one example, the bit-depth syntax element 65 may be a 4-bit syntax element that indicates a bit-depth reduction or expansion from 1 to 16 bits. It should be noted that any length syntax element may be chosen to indicate the output bit-depth. In the example in FIG. 4, the syntax element 65 indicates the output bit-depth of the encoded samples and consequently, the process to follow at the decoder. The syntax element may also be signaled in a sequence parameter set (SPS), a picture parameter set (PPS), or a slice header.

In another example, the quantization step itself (e.g., a number of right shifts) can be signaled, by the encoder to the decoder, at the sequence header, at the frame header, or immediately after the signaling of the PCM mode for the coding unit, prediction unit or block. The encoder may signal the quantization step in the bitstream when the PCM mode is signaled for the first block where the quantized PCM mode has been selected in the frame. The rest of the quantized PCM mode blocks in the frame would assume the same quantization step as signaled for the first PCM mode block in the frame.

In another example, subsequent quantized PCM mode blocks encountered in a frame may signal a delta of the quantization step used for that block from a baseline quantization step. In some examples, the baseline quantization may be the quantization step used in the previous block where the quantized PCM mode was used. In this example, the baseline quantization step would be the first quantization step signaled in the bitstream for the first block for which the quantized PCM was used. Then, the quantization step for each of the subsequent PCM mode blocks in the frame may be signaled as a delta value relative to the previously signaled quantization step.

Hence, each PCM mode block in a frame or slice may have a quantization step that is explicitly signaled on an individual basis for the block, shares the same quantization step initially signaled for a first PCM mode block in a frame or slice, or have a quantization step that is signaled by a delta relative to the quantization step initially signaled for a first PCM mode block in a frame or slice.

It should be noted that, although shown as separate functional units for ease of illustration, the structure and functionality of the quantization unit 49, the pulse code modulation unit 51, the quantization step selection unit 53, and the quantization step selection memory 55 may be highly integrated with one another.

Figure 5:
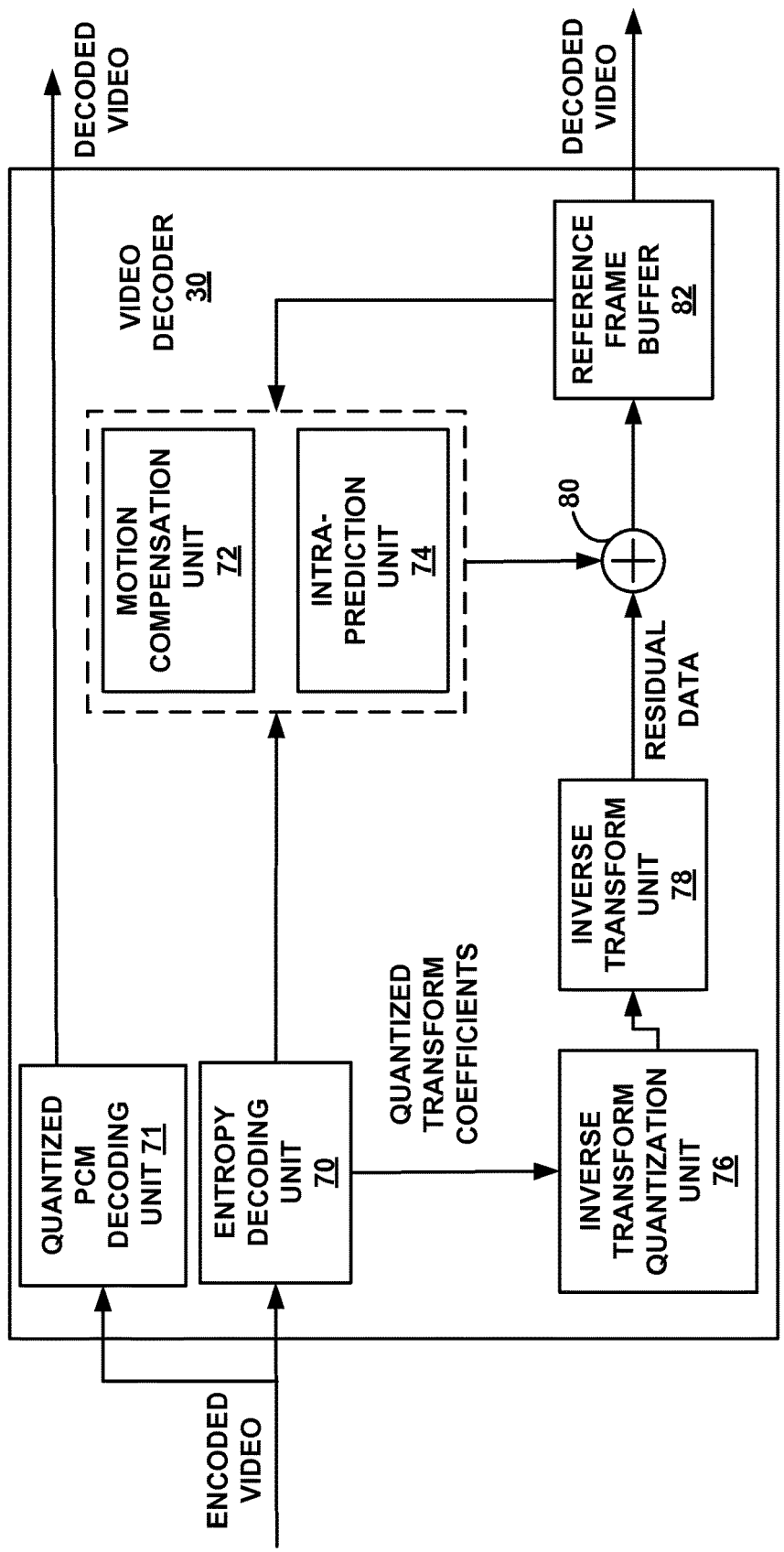
FIG. 5 is a block diagram illustrating an example video decoder.

FIG. 5 is a block diagram illustrating an example of a video decoder 30, which decodes an encoded video sequence. In the example of FIG. 5, the video decoder 30 includes an entropy decoding unit 70, a quantized PCM decoding unit 71, a motion compensation unit 72, an intra-prediction unit 74, an inverse transform quantization unit 76, an inverse transformation unit 78, a reference frame buffer 82 and a summer 80. The video decoder 30 may, in some examples, perform a decoding pass generally reciprocal to the encoding pass described with respect to the video encoder 20 described with reference to FIG. 2. The motion compensation unit 72 may generate prediction data based on motion vectors received from the entropy decoding unit 70. The intra-prediction unit 74 may generate prediction data for a current block of a current frame based on a signaled intra-prediction mode and data from previously decoded blocks of the current frame.

In some examples, the entropy decoding unit 70 (or the inverse transform quantization unit 76) may scan the received values using a scan mirroring the scan order used by the entropy encoding unit 56 (or the transform quantization unit 54) of the video encoder 20. Although the scanning of coefficients may be performed in the inverse transform quantization unit 76, scanning will be described for purposes of illustration as being performed by the entropy decoding unit 70. In addition, although shown as separate functional units for ease of illustration, the structure and functionality of the entropy decoding unit 70, the inverse transform quantization unit 76, and other units of the video decoder 30 may be highly integrated with one another.

The entropy decoding unit 70 may be configured to apply the scan order to convert the 1D vector of transform coefficients into a 2D array of transform coefficients. The entropy decoding unit 70 uses the inverse of the scan order to scan the 1D vector into the 2D array. The 2D array of transform coefficients produced by the entropy decoding unit 70 may be quantized and may generally match the 2D array of transform coefficients scanned by the entropy encoding unit 56 of the video encoder 20 to produce the 1D vector of transform coefficients.

The inverse transform quantization unit 76 inverse quantizes, i.e., de-quantizes, the quantized transform coefficients provided in the bitstream and decoded by the entropy decoding unit 70. The inverse quantization process may include a conventional process, e.g., similar to the processes proposed for HEVC or defined by the H.264 decoding standard. The inverse quantization process may include use of a quantization parameter calculated by the video encoder 20 for the coding unit to determine a degree of quantization and, likewise, a degree of inverse quantization that should be applied. The inverse transform quantization unit 76 may inverse quantize the transform coefficients either before or after the coefficients are converted from a 1D vector to a 2D array.

The inverse transform unit 78 applies an inverse transform, e.g., an inverse DCT, an inverse integer transform, an inverse KLT, an inverse rotational transform, an inverse directional transform, or another inverse transform. In some examples, the inverse transform unit 78 may determine an inverse transform based on signaling from the video encoder 20, or by inferring the transform from one or more coding characteristics such as block size, coding mode, or the like. In some examples, the inverse transform unit 78 may determine a transform to apply to the current block based on a signaled transform at the root node of a quadtree for a largest coding unit including the current block. In some examples, the inverse transform unit 78 may apply a cascaded inverse transform.

The motion compensation unit 72 produces motion compensated blocks, possibly performing interpolation based on interpolation filters. Identifiers for interpolation filters to be used for motion estimation with sub-pixel precision may be included in the syntax elements. The motion compensation unit 72 may use interpolation filters as used by the video encoder 20 during encoding of the video block to calculate interpolated values for sub-integer pixels of a reference block. The motion compensation unit 72 may determine the interpolation filters used by the video encoder 20 according to received syntax information and use the interpolation filters to produce predictive blocks.

The motion compensation unit 72 and the intra-prediction unit 74, in an HEVC example, may use some of the syntax information (e.g., provided by a quadtree) to determine sizes of the largest coding units used to encode frame(s) of the encoded video sequence, split information that describes how each coding unit of a frame of the encoded video sequence is split (and likewise, how sub-coding units are split), modes indicating how each split is encoded (e.g., intra- or inter-prediction, and for intra-prediction an intra-prediction encoding mode), one or more reference frames (and/or reference lists containing identifiers for the reference frames) for each inter-encoded prediction unit, and other information to decode the encoded video sequence.

The summer 80 combines the residual blocks with the corresponding prediction blocks generated by the motion compensation unit 72 or the intra-prediction unit 74 to form decoded blocks. If desired, a deblocking filter may also be applied to filter the decoded blocks in order to remove blockiness artifacts. The decoded video blocks are then stored in the reference frame buffer 82, which provides reference blocks for subsequent motion compensation and also produces decoded video for presentation on a display device (such as display device 32 of FIG. 1).

The quantized PCM decoding unit 71 is configured to decode the encoded video when the quantized PCM mode was used by the encoder 20. The quantized PCM decoding unit 71 first pulse code demodulates the encoded video. Next, the quantized PCM decoding unit 71 inverse quantizes the pulse code demodulated video using the same quantization step used in the encoding process and a rounding offset. The quantization step may be directly signaled in the encoded video bitstream or may be inferred from an output bit depth that is signaled in the encoded video bitstream.

Figure 6:
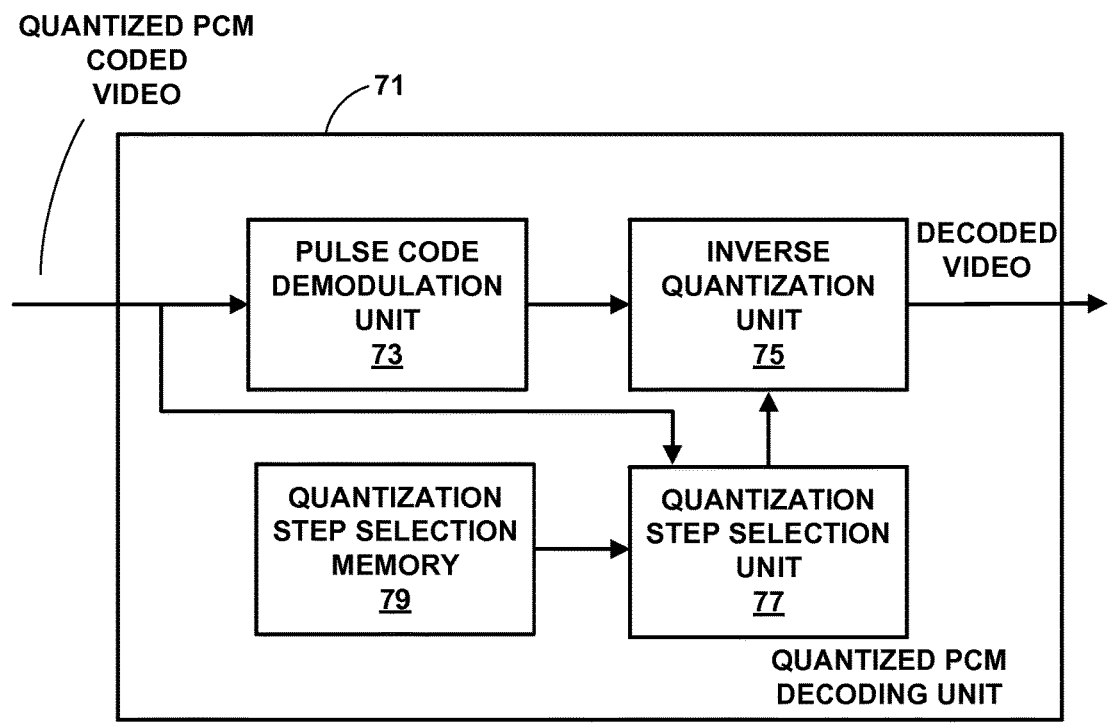
FIG. 6 is a block diagram illustrating an example quantized PCM decoding unit of a video decoder.

FIG. 6 shows a block diagram illustrating an example of the quantized PCM decoding unit 71. The quantized PCM decoding unit may include a pulse code demodulation unit 73, an inverse quantization step unit 75, a quantization step selection unit 77, and a quantization step selection memory 79. It should be noted that, although shown as separate functional units for ease of illustration, the structure and functionality of the pulse code demodulation unit 73, the inverse quantization step unit 75, the quantization step selection unit 77, and the quantization step selection memory 79 may be highly integrated with one another.

Initially, the pulse code demodulation unit 73 pulse code demodulates the quantized PCM encoded video. This step essentially reverses the pulse code modulation applied by the encoder. Next, the inverse quantization unit 75 inverse quantizes the demodulated video using the same quantization step used to encode video as well as a round offset.

The quantization step selection unit 77 may retrieve a syntax element indicating the output bit-depth and/or quantization step from the encoded bitstream. As one example, as shown in FIG. 4, the output bit-depth may be signaled as a 4-bit syntax element that indicates a bit-depth reduction or expansion from 1 to 16 bits. In another example, the output bit depth may be signaled explicitly, rather than indirectly. Alternatively, the decoder may infer, a certain value of the quantization step of PCM samples based on the same criteria or video characteristics used by the encoder to select the quantization step, such as the frame spatial resolution, the quantization (QP) for the pertinent coding unit, the coding structure of a pertinent coding unit, or the frame type (e.g., intra (I) or inter (P or B) frame), the bit depth of the input data, internal data or output data, the particular video application, or the level or the profile in which the video sequence is encoded. As another example, the quantization step selection unit 77 may simply access a predetermined quantization step stored in the quantization step selection memory 79.

Given the signaled, predetermined, or inferred quantization step, the inverse quantization unit 75 may perform inverse quantization using the quantization step and a signaled, inferred or predetermined rounding offset. To perform inverse quantization, the inverse quantization unit 75 may simply add bits (i.e., an equal number of left shifts to the number of right shifts used in the encoder) to the demodulated samples and apply the selected rounding offset to generate the decoded video.

Figure 7:
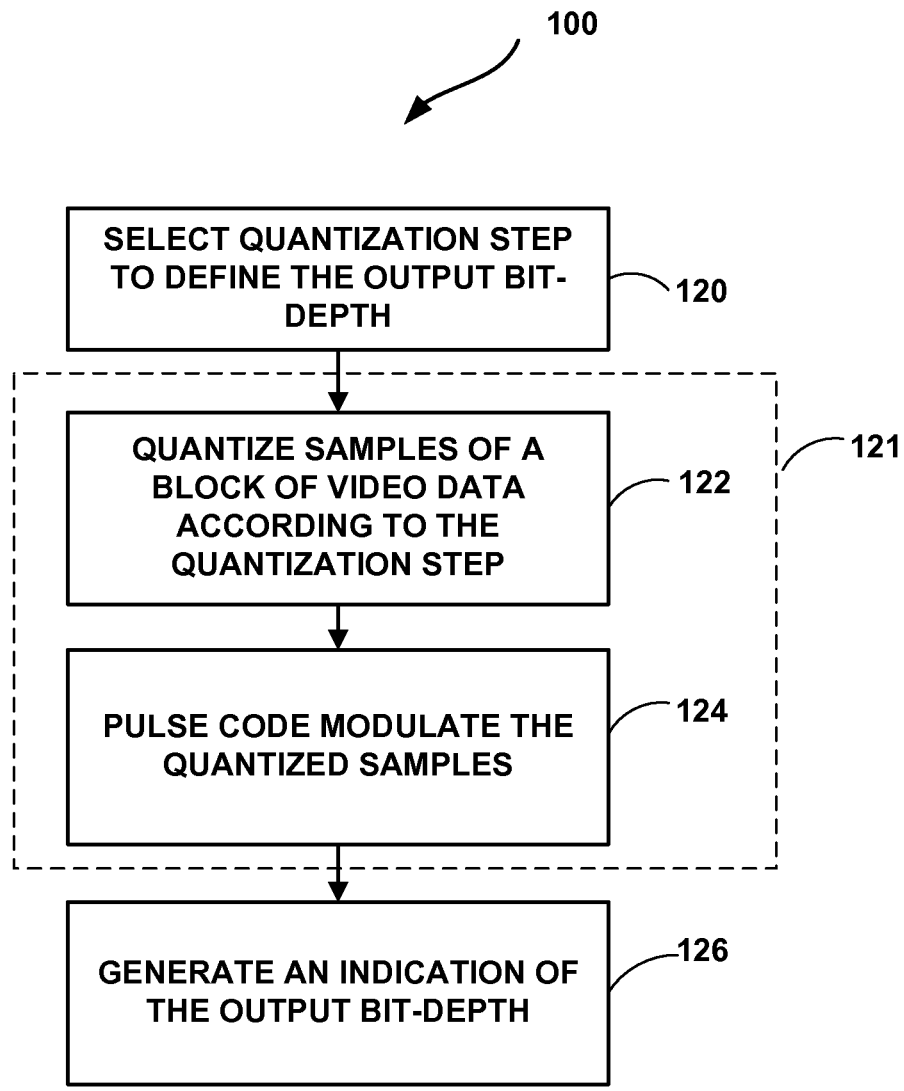
FIG. 7 is a flow chart illustrating an example encoding process.

FIG. 7 is a flowchart illustrating an example encoding process. Method 100 encodes blocks of video according to a quantized PCM coding process described above with reference to FIGS. 2-4. In method 100, a video encoder 20 selects a quantization step to define an output bit-depth (120). Based on this output bit-depth, the video encoder 20 performs quantized PCM encoding (121). The first step of quantized PCM encoding is to quantize samples of a block of video data according to the selected quantization step (122). Step 122 may include quantizing the samples of the block of video data by executing a number of right shifts of the samples of the block of video data, wherein the number of right shifts is based on the quantization step. Next, the video encoder 20 pulse code modulates the quantized samples (124). As an optional step, the video encoder 20 may also generate an indication of the output bit-depth and signal that indication in the encoded video bitstream (126).

As discussed above, the output bit-depth is a definable parameter. In that regard, it may be defined by the selection of the quantization step used for the quantization process. The quantization step may be a pre-determined value or may be selected based on one or more characteristics of the video data. As another example, the quantization step may be selected to reduce the difference of appearance between the PCM-coded video data and the lossy data produced by predictive coding. In particular, the quantization step may be selected such that an amount of distortion presented by the PCM-coded video data is similar to the amount of distortion presented by the predictively coded video data. The amount of distortion may be determined explicitly or estimated, for example, based on a quantization parameter (QP) used by the transform quantization unit 54 for predictively coded video data. Other criteria and characteristics that may be used to select the quantization step include the frame spatial resolution, the quantization (QP) for the pertinent coding unit, the coding structure of a pertinent coding unit, frame rate, the frame type (e.g., intra (I) or inter (P or B) frame), the bit-depth of the input data, internal data or output data, the particular video application, or the level or the profile in which the pertinent video sequence is encoded. The quantization step may be common to multiple blocks of video data or may be selected for each individual block of video data.

Step 126 may generate an indication of the output bit-depth and/or the quantization step itself and signal that indication in a bitstream of encoded video data. The indication of the output bit-depth and/or quantization step allows a decoder to inverse the quantization process. In particular, the output bit-depth may be signaled in a sequence header as a 4-bit syntax element that indicates a bit-depth reduction or expansion from 1 to 16 bits. In addition, step 126 may also signal a rounding offset in the video bitstream to indicate to a decoder how to perform the inverse quantization process. If individual quantization steps are used for different blocks of video data, the encoder 20 may represent the individual quantization steps as delta values relative to a base quantization step.

Figure 8:
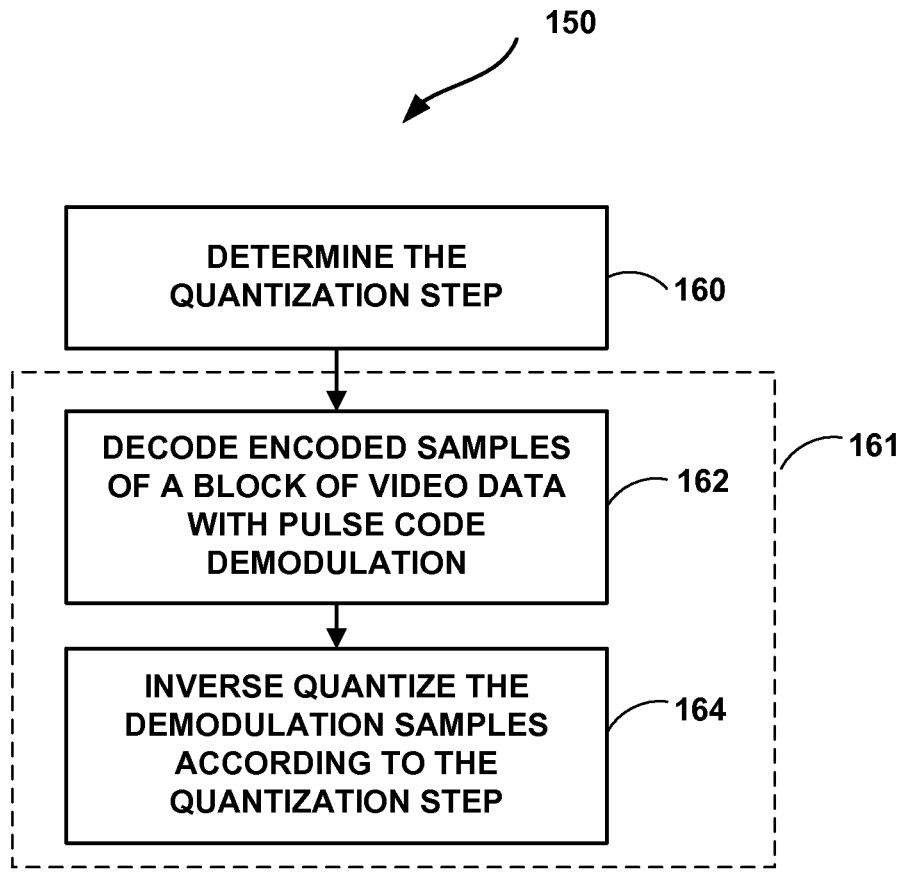
FIG. 8 is a flow chart illustrating an example decoding process.

FIG. 8 is a flow chart illustrating an example decoding process. Method 150 decodes blocks of video according to a quantized PCM decoding process described above with reference to FIGS. 5 and 6. In method 150, a video decoder 30 first determines a quantization step (160). Next, the video decoder performs a quantized PCM decoding process 161. The quantized PCM decoding process includes decoding encoded video block with pulse code demodulation (162). Next, using the determined quantization step and a rounding offset, the video decoder 30 inverse quantizes the demodulated video block.

In step 160, the quantization step may be determined by using a pre-selected value, by receiving an indication of the output bit-depth and/or quantization step in the output bitstream, or from characteristics of the video data itself in the same manner as selecting the quantization step in the encoding process.

In one or more examples, the functions described in this disclosure may be implemented in hardware, software, firmware, or any combination thereof. If implemented in software, the functions may be performed by a hardware-based processing unit, such as one or more processors, that execute the software in the form of computer-readable instructions or code. Such instructions or code may be stored on or transmitted over a computer-readable medium and executed by a hardware-based processing unit. Computer-readable media may include computer-readable storage media, which corresponds to a tangible, non-transitory medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, Flash memory, CD-ROM or any other solid state, optical or magnetic data storage media, including optical disk storage, magnetic disk storage, or other magnetic storage devices, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that tangible computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be performed by a wide variety of devices or apparatuses, including desktop computers, notebook (i.e., laptop) computers, tablet computers, set-top boxes, telephone handsets such as so-called smartphones, televisions, cameras, display devices, digital media players, video gaming consoles, or the like. In many cases, such devices may be equipped for wireless communication. In addition, such techniques may be implemented by an integrated circuit (IC) or a set of ICs (e.g., a chip set). A device configured to perform the techniques of the this disclosure may include any of the devices mentioned above and, in some cases, may be a video encoder or video decoder, or combined video encoder-decoder, i.e., a video CODEC, which may be formed by a combination of hardware, software, and firmware. Various components, modules, or units may be described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various embodiments of the invention have been described. These and other embodiments are within the scope of the following claims.

The invention claimed is:

1. A method for encoding video data, the method comprising:
   encoding at least one block of a frame of video data using intra-prediction, the intra-prediction comprising calculating a difference between samples of the at least one block and samples of a predictive block formed from samples of another block of the frame of video data; and
   encoding samples of one or more other blocks of the frame of video data using quantized pulse code modulation according to an output bit-depth, wherein the encoding is performed without any frequency domain transformation of the samples, and wherein the samples of the one or more other blocks of video data have a bit-depth greater than the output bit-depth so as to introduce loss to the samples.

2. The method of claim 1, wherein encoding samples of the one or more other blocks of video data using quantized pulse code modulation according to the output bit-depth comprises:
   quantizing the samples of the one or more other blocks of video data according to a quantization step defining an amount of quantization to produce the output bit-depth; and
   pulse code modulating the quantized samples.

3. The method of claim 2, wherein the output bit-depth is a definable parameter.

4. The method of claim 3, further comprising:
   selecting the quantization step for the quantized samples to define the output bit-depth.

5. The method of claim 4, wherein selecting the quantization step comprises selecting the quantization step based on one or more characteristics of the video data.

6. The method of claim 2, wherein quantizing the samples of the one or more other blocks of video data according to the quantization step comprises a number of right shifts of the samples of the block of video data, wherein the number of right shifts is based on the quantization step.

7. The method of claim 1, wherein encoding samples of the one or more other blocks of video data using quantized pulse code modulation comprises:
   quantizing samples of multiple blocks of video data according to a common quantization step; and
   pulse code modulating the quantized samples in the multiple blocks of video data.

8. The method of claim 1, wherein encoding samples of the one or more other blocks of video data using quantized pulse code modulation comprises:
   quantizing samples of a first block of video data according to a first quantization step;
   quantizing samples of a second block of video data according to a second quantization step different from the first quantization step; and
   pulse code modulating the quantized samples in the first and second blocks of video data.

9. The method of claim 8, further comprising:
   representing the first quantization step and the second quantization step as delta values relative to a base quantization step.

10. The method of claim 1, further comprising:
    generating an indication of the output bit-depth and including the indication in an encoded bitstream.

11. The method of claim 10, further comprising:
    including the indication of the output bit-depth in a sequence header as a syntax element.

12. The method of claim 10, further comprising:
    including an indication of a round offset in an encoded bitstream that includes the coded block of video data.

13. A method for decoding video data, the method comprising:
    decoding at least one block of a frame of video data using intra-prediction, the intra-prediction comprising combining samples of residual data for the at least one block and samples of a predictive block formed from samples of another block of the frame of video data; and decoding samples of one or more other blocks of the frame of video data that have been encoded with quantized pulse code modulation according to an output bit-depth to create decoded samples, wherein the decoding is performed without any frequency domain transformation of the samples, and wherein the decoded samples have a bit-depth greater than the output bit-depth.

14. The method of claim 13, wherein decoding samples of the one or more other blocks of video data according to the output bit-depth comprises:
   decoding the samples of the one or more other blocks of video data using pulse code demodulation; and
   inverse quantizing the decoded samples according to a quantization step.

15. The method of claim 14, wherein the quantization step is based on the output bit-depth.

16. The method of claim 15, wherein inverse quantizing the decoded samples comprises:
   inverse quantizing the decoded samples according to the quantization step and a rounding offset.

17. The method of claim 14, further comprising:
   determining the quantization step based on one or more characteristics of the frame of video data.

18. The method of claim 13, further comprising:
   receiving the output bit-depth in an encoded bitstream that includes the frame of video data.

19. An apparatus configured to encode video data, the apparatus comprising:
   a memory configured to store video data; and
   a video encoding unit configured to:
   encode at least one block of a frame of the video data using intra-prediction, the intra-prediction comprising calculating a difference between samples of the at least one block and samples of a predictive block formed from samples of another block of the frame of video data; and
   encode samples of one or more other blocks of the frame of video data using quantized pulse code modulation according to an output bit-depth, wherein the encoding is performed without any frequency domain transformation of the samples, and wherein the samples of the one or more other blocks of video data have a bit-depth greater than the output bit-depth so as to introduce loss to the samples.

20. The apparatus of claim 19, wherein the video encoding unit comprises:
   a quantization unit configured to quantize the samples of the one or more other blocks of video data according to a quantization step defining an amount of quantization to produce the output bit-depth; and
   a modulation unit configured to code the quantized samples using pulse code modulation.

21. The apparatus of claim 20, wherein the output bit-depth is a definable parameter.

22. The apparatus of claim 21, wherein the video encoding unit is further configured to select the quantization step for the quantized samples to define the output bit-depth.

23. The apparatus of claim 22, wherein the video encoding unit is configured to select the quantization step based on one or more characteristics of the video data.

24. The apparatus of claim 20, wherein the quantization unit is configured to quantize the samples of the one or more other blocks of video data using a number of right shifts of the samples of the block of video data, wherein the number of right shifts is based on the quantization step.

25. The apparatus of claim 19, wherein the video encoding unit comprises:
   a quantization unit configured to quantize samples of multiple blocks of video data according to a common quantization step; and
   a modulation unit configured to code the quantized samples using pulse code modulation in the multiple blocks of video data.

26. The apparatus of claim 19, wherein the video encoding unit comprises:
   a quantization unit configured to quantize samples of a first block of video data according to a first quantization step and to quantize samples of a second block of video data according to a second quantization step different from the first quantization step; and
   a modulation unit configured to code the quantized samples in the first and second blocks of video data using pulse code modulation.

27. The apparatus of claim 26, wherein the video encoding unit is further configured to represent the first quantization step and the second quantization step as delta values relative to a base quantization step.

28. The apparatus of claim 19, wherein the video encoding unit is further configured to generate an indication of the output bit-depth and to include the indication in an encoded bitstream.

29. The apparatus of claim 28, wherein the video encoding unit is further configured to include the indication of the output bit-depth in a sequence header as a syntax element.

30. The apparatus of claim 28, wherein the video encoding unit is further configured to include an indication of a round offset in an encoded bitstream that includes the coded block of video data.

31. An apparatus configured to decode video data, the apparatus comprising:
   a memory configured to store video data; and
   a video decoding unit configured to:
   decode at least one block of a frame of the video data using intra-prediction, the intra-prediction comprising combining samples of residual data for the at least one block and samples of a predictive block formed from samples of another block of the frame of video data; and
   decode samples of one or more other blocks of the frame of video data that have been encoded with quantized pulse code modulation according to an output bit-depth to create decoded samples, wherein the decoding is performed without any frequency domain transformation of the samples, and wherein the decoded samples have a bit-depth greater than the output bit-depth.

32. The apparatus of claim 31, wherein the video decoding unit comprises:
   a demodulation unit configured to decode the samples of the one or more other blocks of video data using pulse code demodulation; and
   an inverse quantization unit configured to inverse quantize the decoded samples according to a quantization step.

33. The apparatus of claim 32, wherein the quantization step is based on the output bit-depth.

34. The apparatus of claim 33, wherein the inverse quantization unit is further configured to inverse quantize the decoded samples according to the quantization step and a rounding offset.

35. The apparatus of claim 34, wherein the video decoding unit is further configured to receive the output bit-depth in an encoded bitstream that includes the frame of video data.

36. The apparatus of claim 32, wherein the video decoding unit is further configured to determine the quantization step based on one or more characteristics of the one or more other blocks of video data.

37. An apparatus configured to encode video data, the apparatus comprising:
means for encoding at least one block of a frame of video data using intra-prediction, the intra-prediction comprising calculating a difference between samples of the at least one block and samples of a predictive block formed from samples of another block of the frame of video data; and
means for encoding samples of one or more other blocks of the frame of video data using quantized pulse code modulation according to an output bit-depth, wherein the encoding is performed without any frequency domain transformation of the samples, and wherein the samples of the one or more other blocks of video data have a bit-depth greater than the output bit-depth so as to introduce loss to the samples.

38. The apparatus of claim 37, further comprising:
means for generating an indication of the output bit-depth and including the indication of the output bit-depth in a sequence header as a syntax element.

39. An apparatus configured to decode video data, the apparatus comprising:
means for decoding at least one block of a frame of video data using intra-prediction, the intra-prediction comprising combining samples of residual data for the at least one block and samples of a predictive block formed from samples of another block of the frame of video data a; and
means for decoding samples of one or more other blocks of the frame of video data that have been encoded with quantized pulse code modulation according to an output bit-depth to create decoded samples, wherein the decoding is performed without any frequency domain transformation of the samples, and wherein the decoded samples have a bit-depth greater than the output bit-depth.

40. The apparatus of claim 39, further comprising:
means for receiving the output bit-depth in an encoded bitstream that includes the frame of video data.

41. A non-transitory computer-readable storage medium having stored thereon instructions that, when executed, cause one or more processors of a device for encoding video to:
encode at least one block of a frame of video data using intra-prediction, the intra-prediction comprising calculating a difference between samples of the at least one block and samples of a predictive block formed from samples of another block of the frame of video data; and
encode samples of one or more other blocks of the frame of video data using quantized pulse code modulation according to an output bit-depth, wherein the encoding is performed without any frequency domain transformation of the samples, and wherein the samples of the one or more other blocks of video data have a bit-depth greater than the output bit-depth so as to introduce loss to the samples.

42. The non-transitory computer-readable storage medium of claim 41, wherein the instructions to encode samples of the one or more other blocks of video data using quantized pulse code modulation according to an output bit-depth comprise instructions to:
quantize the samples of the one or more other blocks of video data according to a quantization step defining an amount of quantization to produce the output bit-depth; and
pulse code modulate the quantized samples.

43. The non-transitory computer-readable storage medium of claim 41, further causing a processor to:
generate an indication of the output bit-depth and including the indication of the output bit-depth in a sequence header as a syntax element.

44. A non-transitory computer-readable storage medium having stored thereon instructions that, when executed, cause one or more processors of a device for decoding video data to:
decode at least one block of a frame of video data using intra-prediction, the intra-prediction comprising combining samples of residual data for the at least one block and samples of a predictive block formed from samples of another block of the frame of video data; and
decode samples of one or more other blocks of the frame of video data that have been encoded with quantized pulse code modulation according to an output bit-depth to create decoded samples, wherein the decoding is performed without any frequency domain transformation of the samples, and wherein the decoded samples have a bit-depth greater than the output bit-depth.

45. The non-transitory computer-readable storage medium of claim 44, wherein the instructions to decode samples of the one or more other blocks of video data according to an output bit-depth comprise instructions to:
decode the samples of the one or more other blocks of video data using pulse code demodulation; and
inverse quantize the decoded samples according to a quantization step.

46. The non-transitory computer-readable storage medium of claim 44, wherein the quantization step is based on the output bit-depth.

47. The non-transitory computer-readable storage medium of claim 44, the instructions further causing a processor to:
receive the output bit-depth in an encoded bitstream that includes the frame of video data.

* * * * *